Aug. 5, 1930.  J. A. TAFT  1,772,164
COTTON BALING
Filed April 12, 1924
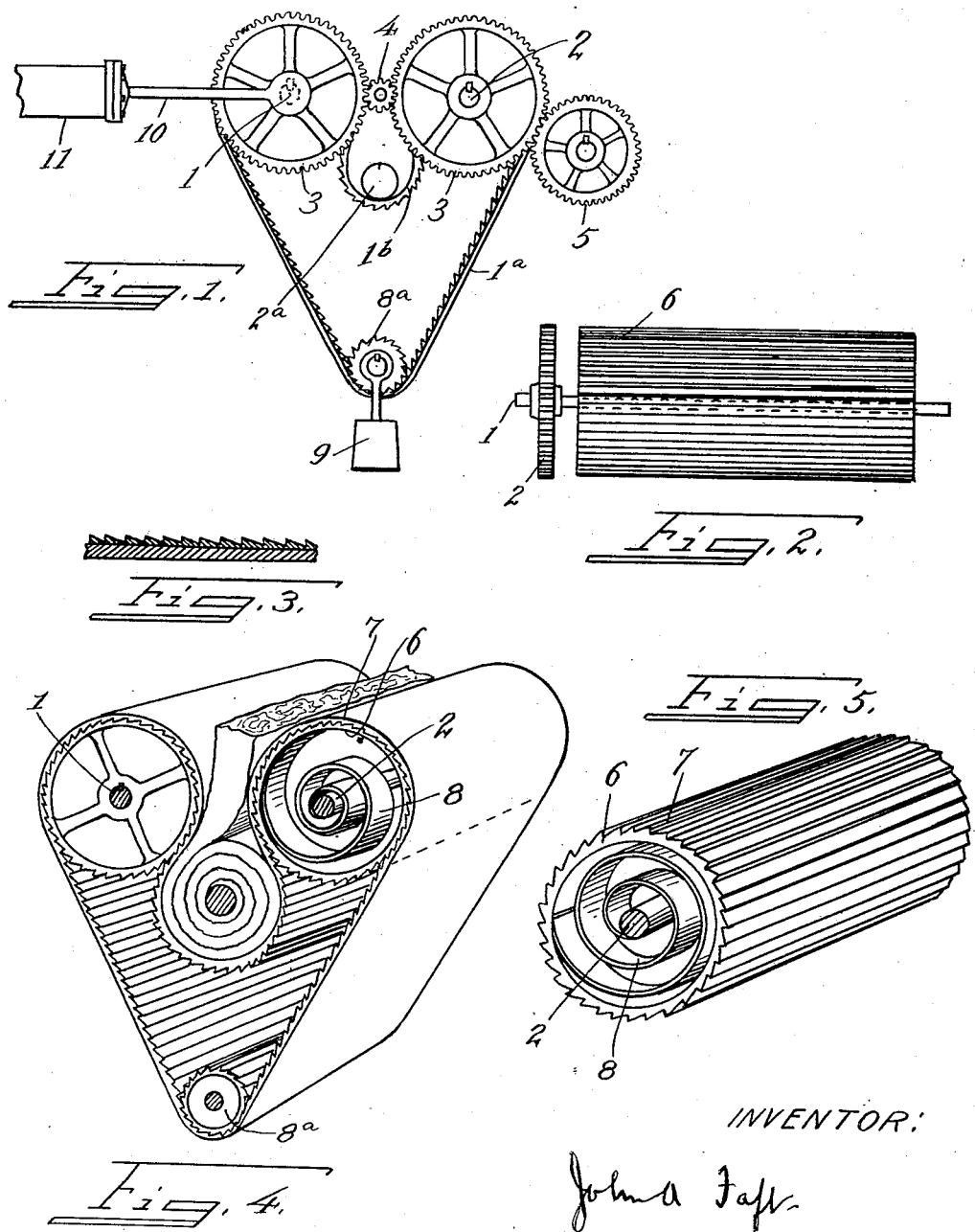

Patented Aug. 5, 1930

1,772,164

UNITED STATES PATENT OFFICE

JOHN A. TAFT, OF CORPUS CHRISTI, TEXAS, ASSIGNOR TO P. M. CLARK, OF DALLAS, TEXAS

COTTON BALING

Application filed April 12, 1924. Serial No. 706,204.

My invention relates to the art of baling cotton in cylindrical bales, and to the maintenance of proper pressure on the cotton during the spinning of the cylindrical bale.

It is a known fact that cotton is one of the most stubborn substances to handle or to successfully form into bales or packages for the reason of its elastic tendency. It is helpless and stubborn in this disposition when put through any form of operation that would produce a compact package. A means must be produced that will substantially press all the air out of the cotton and hold same in its compressed condition while being formed into packages or bales. For illustration:—the present system now in vogue, known as the square bale, compresses the package to a high-density of 48 pounds per cubic foot. When this package or bale is released it expands to a bale containing about 28 to 30 pounds density to the cubic foot. This explanation shows the great elastic limit to cotton. This being the case it is essential to hold the material in a package or bale under constant compression at all times of forming the bale, and to be able to secure and firmly hold the initial density when the bale is completed. The method of baling cotton, I am about to describe, has for its novel feature a construction that enables the operator to compress the cotton into a dense mass and hold same under control and maintain the initial density at the completion of the operation.

This is accomplished by the use of a belt or band which encircles the circumference of the bale from the commencement to the completion of same. The mechanism that controls the movement of the belt or band about the circumference of the bale is so designed that the belt surrounding the circumference will be increased accordingly, holding the density of the cotton being baled throughout the entire operation.

There have been patents granted showing belts within loops of which a web of cotton is fed, the cotton being rolled up within the belts. Also attempts have been made to my knowledge to practice baling cotton in this manner, that is to say, a pair of driven rollers have been provided and a belt passed over these rollers, with a tension roller to keep the belt tight but to permit it to accumulate between the two rollers. When cotton was fed between the two main rollers, and it was attempted to form a cylindrical mass in the loop of the moving belt, the devices as above noted have uniformly failed.

The reason for failure has been that when sufficient tension was applied to the belt by the tension rollers, to give proper density to the cotton, the mechanism would bind and lock the movement of the rollers, so that they would not revolve. Also when tensions were so arranged that a large cylinder was accumulated within the loop of the belt between the two rollers, then the belt would slip, and the pressure and density would diminish.

According to my process the drive is so arranged as to be non-slipping, and the density is not dependent upon the tension on the belt as maintained by a tension roll, but upon the spacing of the two rollers, and the control of the amount of the belt that is permitted to accumulate between them.

I have not attempted to show a complete machine for the purpose of accomplishing my object, but rather to indicate a structure, which it would be within the skill of the man trained in this particular art to apply to a complete mechanism.

I accomplish my object above designated by that certain method of baling to be hereinafter more specifically pointed out and claimed.

In the drawing:

Figure 1 is a side elevation showing the drive of a suitable mechanism for accomplishing my object.

Figure 2 is a side elevation of one of the roller elements.

Figure 3 is a detail of a section of a belt, which could be used with my invention.

Figure 4 is a perspective diagram, showing the method of baling in a cylinder.

Figure 5 is a like perspective showing the inner mechanism in one of the rollers.

According to my process a belt is driven by two rollers, with which it has a positive engagement. Thus the belt may be formed of links or chains, formed into a web, and the rollers may have peripheral rows of staggered lugs to engage the links of the belt.

Both rollers will be driven in a like direction to each other, and the belt will be permitted to accumulate in a loop between the rollers, by permitting a tensionally controlled rotary play between one or both of the rollers and their shafts, positively driven as above noted.

The exact mechanical means adopted to accomplish the above purpose is not essential.

I have shown for example, two shafts 1 and 2, each having a gear 3 thereon, with the two gears connected by an idle gear 4. The one of the gears 3 may be driven by another power gear 5.

The rollers, as indicated in Figure 2, may be formed with surfaces 6 of cylindrical shape, having interspaced staggered rows of lugs 7 thereon.

One of the rollers, at least, is secured to its shaft by means of a number of springs 8, which are secured to the shaft and the roller cylinder in any desired manner. One of the rollers may be fast on its shaft. The belt $1^a$ is passed down between the rollers and a bar $2^a$ is set into it, to hold in the loop $1^b$ and act as a core for the bale.

Instead of the spring, the one or both of the rollers may be mounted on its shaft by means of some approved form of adjustable friction clutch, which will only give way when a certain torque has been attained, the essential being that when the strain on the roller, which has rotary play on its shaft, has passed a certain point, this roller will give, so as to permit more of the belt to accumulate between the two rollers.

As a tension for the belt to hold it on the two rollers, I may provide a roller $8^a$ held by means of weights 9. These weights have nothing substantial to do with the tension on the belt between the two rollers.

As a means to relieve the tension between the two rollers, one of them may be mounted on the piston rods 10, to hydraulic cylinders 11, these rods carrying the journals for the shaft, that mounts this roller. I have shown this hydraulic pressure as applied to the driven one of the pair of roller shafts, and when desiring to straighten out the belt between the two rollers, the hydraulic rams may be operated to withdraw the roller held thereby (Figure 4) which will result in ejecting the bale from between the two rolls.

In operation the two rollers or drums are brought together, and a bat of cotton is fed into the belt, and the drums set into rotation. The cotton is squeezed between the drums, and is revolved within the belt with the result forming a cylindrical bale. The amount of belt which accumulates between the rolls is dependent upon the strain which is necessary to overcome the roll that is equipped with the springs, or the friction clutch or the like. The belt is constantly driven, and cannot slip on the rolls or drums. The tension roller does not place strain on the axles of the rollers or drums, and all they have to do is support the weight of the bale. As a result of this the axles do not become cramped, and will not bind.

The power necessary to form the compressed bale is thus much less, and the belt has a longer life.

Thus the essence of my process is to form the bale in a loop of the belt positively driven on both sides of the loop, and not frictionally driven. The pressure on the cotton is controlled absolutely, without any pulling down strain on the belt driving means, as is the case where the tension on the belt controls the compression on the bale. The incoming cotton, as it is fed into the belt, is always compressed by being forced to pass through an opening which is constant. Thus the combined action of the freedom of one or both rolls to give in a rotary direction and the constant spacing of their peripheries apart, combined to provide what I have termed as a constant and absolute control of pressure on the cotton mass.

Such freedom of the spring mounted roll or drum, shown in my diagram, to move crosswise of its axle or shaft, will result in a movement toward the center of the bale and will not be of such an extent as to effect the predetermined spacing of the rolls. Where a controlled friction is used, this effect would not be present at all.

It will be noted that it is not a requisite that the belt form a depending loop, outside of the loop in which the bale is formed, as any means for keeping a continuous belt in feeding contact with a pair of intermeshing rolls, will suffice.

Having thus described my invention, what I claim as new and desire to secure by Letters Patent, is:—

1. In a cotton baling apparatus, spaced rolls having positively driven shafts, a belt passed over said rolls and having a depending loop intermediate thereof, and a yieldable connection between one of said shafts and its roll.

2. In a cotton baling apparatus, spaced rolls having positively driven shafts, a belt passed over said rolls and having a loop intermediate thereof, a yieldable connection between one of said shafts and its roll, and means on the belt cooperating with one roll to effect a lagging rotation thereof incident to strain upon the belt.

3. An apparatus of the class described comprising means for assembling cotton fibre into a compact mass, and means for exerting an elastically variable compression stress upon the said mass at all times as the same is being assembled.

4. An apparatus of the class described comprising means for rolling cotton fibre web into a roll, and means for exerting an elastically variable compression stress upon the said roll at all times during the rolling of the same.

5. In a cotton baling apparatus, spaced rolls, a rotatable shaft for carrying each of said rolls, a belt passing over said rolls and looped intermediate thereof, means for positively driving one of said rolls, and driving means for another of said rolls, including a resilient connection between the last mentioned roll and its respective shaft.

6. In a cotton baling apparatus, a pair of spaced rolls, a rotatable shaft for each of said rolls, a belt passing over said rolls and looped intermediate thereof, means formed on said belt and rolls for causing positive engagement between the same, driving means for each of said shafts, and a spring fastened to one of said shafts and its respective roll for resiliently mounting said roll to permit variable movement of the same incident to stresses on the loop in said belt.

7. In a cotton baling apparatus, a pair of spaced rolls, a rotatable shaft for each of said rolls, a belt passing over said rolls and looped intermediate thereof, driving means for the said shafts, and a spiral spring connection between one of said shafts and its respective roll.

JOHN A. TAFT.